US011875369B2

United States Patent
Lewis et al.

(10) Patent No.: US 11,875,369 B2
(45) Date of Patent: Jan. 16, 2024

(54) AGRICULTURAL DATA INTELLIGENCE

(71) Applicant: Highland Ag Solutions, LLC, Mulberry, FL (US)

(72) Inventors: Brent Lewis, Mulberry, FL (US); Steve Maxwell, Mulbery, FL (US); Justin Machell, Mulberry, FL (US); Rodney Rose, Mulberry, FL (US)

(73) Assignee: Highland Ag Solutions, LLC, Mulberry, FL (US)

( * ) Notice: Subject to any disclaimer, the term of this patent is extended or adjusted under 35 U.S.C. 154(b) by 0 days.

(21) Appl. No.: 17/470,870

(22) Filed: Sep. 9, 2021

(65) Prior Publication Data

US 2022/0076284 A1 Mar. 10, 2022

Related U.S. Application Data

(60) Provisional application No. 63/076,847, filed on Sep. 10, 2020.

(51) Int. Cl.
*G06Q 30/0204* (2023.01)
*G06Q 50/02* (2012.01)

(52) U.S. Cl.
CPC ......... *G06Q 30/0204* (2013.01); *G06Q 50/02* (2013.01)

(58) Field of Classification Search
CPC ............................ G06Q 30/0204; G06Q 50/02
See application file for complete search history.

(56) References Cited

U.S. PATENT DOCUMENTS

| 10,878,505 B1* | 12/2020 | Blair ...................... G06F 40/20 |
| 2019/0087760 A1* | 3/2019 | Appel ..................... G06Q 10/08 |
| 2021/0120731 A1* | 4/2021 | Mota Manhaes ..... H04L 67/306 |

FOREIGN PATENT DOCUMENTS

WO WO-2021067257 A1 * 4/2021 ......... G06Q 10/1097

OTHER PUBLICATIONS

Dunford, Nurhan. "Food Technology Fact Sheet. Big Data and Opportunities for Agriculture and Food Industry." Robert M. Kerr Food & Agricultural Products Center. Oklahoma Cooperative Extension Service. Dec. 2017 (Year: 2017).*
ams.usda.gov [online], "The Economic Landscape" Aug. 2020, retrieved on Jan. 10, 2022, retrieved from URL <https://www.ams.usda.gov/sites/default/files/media/TheEconomicLandscapeAug2020.pdf., 4 pages.
ams.usda.gov [online], "USDA Market News" Sep. 2015, retrieved on Jan. 10, 2022, retrieved from URL <https://www.ams.usda.gov/market-news>, 2 pages.

* cited by examiner

*Primary Examiner* — Elda G Milef
(74) *Attorney, Agent, or Firm* — Fish & Richardson P.C.

(57) ABSTRACT

Methods, systems, and apparatus, including computer programs encoded on a computer storage medium, for agricultural data intelligence. Data from multiple subscribers (growers and marketers) are aggregated to provide market intelligence to the subscribers. Data and insights are presented in a dashboard format that is intuitive and facilitates ease of use. To prevent data leakage, data anonymization and aggregation processes are implemented.

16 Claims, 11 Drawing Sheets

AGRICULTURAL DATA INTELLIGENCE

CLAIM OF PRIORITY

This application claims priority under 35 USC § 119(e) to U.S. Provisional Patent Application Ser. No. 63/076,847, filed on Sep. 10, 2020, the entire disclosure of which is incorporated by reference.

BACKGROUND

While the agricultural industry has developed and advanced over multiple decades, the ability for growers and marketers to understand the market for their products has not. In the United States, the Department of Agriculture (USDA) created Agriculture Marketing Service (AMS) specialty crop reports to provide pricing, shipping, domestic/international market, and other information to growers and marketers. Historically, these reports have been the only source of information for a grower or marketer to understand the price and volume of a specialty crop that has been sold. But while USDA AMS reports provide a starting point, they can be unreliable and inaccurate, because the information received is limited to a single point in time. The information cannot and does not represent shifts in the market throughout the day due to market volatility. Moreover, when it comes to perishable, short-season commodities, timely, accurate data is of paramount importance.

When the USDA AMS market reports were first published in 1915, the agricultural industry was much different than it is today. The exponential increase in foreign imports, consolidation in the retail grocery industry, and major advancements in data analytics on the buyer side of specialty crops have led to a current competitive landscape that is more dynamic and more challenging for producers than it was over a century ago. Farmers and marketers need real-time data and analytics to compete in a global market, but their needs are not met by USDA AMS reports.

In particular, the AMS specialty crop report does not provide the near-real time (e.g., hourly or half-hourly) data required in the current global market. The information received is limited to a single observation point in time and therefore cannot and does not represent shifts in the market throughout the day due to market volatility. Additionally, the AMS report is not timely by day. For example, the volume report is not refreshed for weekend movement (including Friday) until Monday afternoon at the earliest of the following week and FOB pricing is not provided over the weekends and does not update until the afternoon each day. This means that growers and marketers are relying on data that lags 1-4 days behind the industry.

Additionally, content is lacking in the AMS report. For example, the AMS report lacks FOB prices across all package types (conventional and organic), FOB prices with States/Countries identified with volume on movement, movement with FOB prices to arrive at an aggregated FOB price, and movement by package type.

As for accuracy, the untimeliness and missing content, in and of themselves, lead inaccurate data at any point in time. There are other inaccuracies in the report as well. Most notably, the FOB shipping point price and movement reports rely solely on voluntary information provided by growers and marketers across the industry. Inherently, this produces data tables that are missing information (example, growers/shippers not available to provide information), are without context (example, FOB high price could be for a single unrepresentative pallet), and lack transparency. These are some of the reasons why many in the industry approach the AMS specialty crop report as a starting point for industry data, and only partially rely upon the data for daily decision making.

SUMMARY

In general, one innovative aspect of the subject matter described in this specification can be embodied in methods that include the actions, receiving, from a plurality of subscribers, transactional data from the subscribers, the transactional data describing market transactions for agricultural products; determining, from the transactional data received from the subscribers, market metric data that describes metrics at a market level, wherein the metrics at the market level are based on an aggregation of transactional data from the subscribers; determining, for each subscriber and from the transactional data received from the subscribers, benchmark metric data for each subscriber, wherein the benchmark metric data describes, for the subscriber, benchmark values for the subscriber that compare market performance of the subscriber to the metrics at the market level; for each of a particular agricultural unit, determining, for the market metric data and the benchmark metric data, a minimum aggregate level of transactional data for the particular agricultural unit; for each particular agricultural unit for which the aggregation of transactional data for the particular agricultural unit has not achieved the minimum aggregate level, precluding display of the market metric data and the benchmark metric data for the particular agricultural unit; and for each particular agricultural unit for which the aggregation of transactional data for the particular agricultural unit has achieved the minimum aggregate level, allowing display of the market metric data and the benchmark metric data for the particular agricultural unit. Other embodiments of this aspect include corresponding systems, apparatus, and computer programs, configured to perform the actions of the methods, encoded on computer storage devices.

In some implementations, determining, for the market metric data and the benchmark metric data, the minimum aggregate level for the particular agricultural unit includes determining, based on the market metric data and the benchmark metric data, an aggregate level for a particular agricultural unit that does not reveal specific transactional data for a particular subscriber.

In some implementations, determining, based on the market metric data and the benchmark metric data, an aggregate level for a particular agricultural unit that does not reveal specific transactional data for a particular subscriber includes, in part, determining that transactional data for the particular agricultural unit has been received from at least a plurality of subscribers.

In some implementations, determining, based on the market metric data and the benchmark metric data, an aggregate level for a particular agricultural unit that does not reveal specific transactional data for a particular subscriber includes, in part: determining, from a plurality of geographic areas, wherein the geographic areas are hierarchically arranged so that a geographic area higher in a hierarch is inclusive of all geographic areas lower in the hierarchy, a geographic area lowest in the hierarchy for which the transactional data for the particular agricultural unit has been received from at least a plurality of subscribers for the particular geographic area; and determining, for the geographic areas higher in the hierarchy than the geographic area lowest in the hierarchy for which the transactional data for the particular agricultural unit has been received from at least the plurality of subscribers for the particular geographic area, that the aggregate level for the particular agricultural unit has been met.

In some implementations, determining, based on the market metric data and the benchmark metric data, an aggregate level for a particular agricultural unit that does not reveal specific transactional data for a particular subscriber includes, in part: determining, from a plurality of geographic areas, wherein the geographic areas are hierarchically arranged so that a geographic area higher in a hierarch is inclusive of all geographic areas lower in the hierarchy, a geographic area lowest in the hierarchy for which an aggregate level for a particular agricultural unit that does not reveal specific transactional data for a particular subscriber has been met; and determining, for the geographic areas higher in the hierarchy than the geographic area lowest in the hierarchy for which the transactional data for the particular agricultural unit has been received from at least the plurality of subscribers for the particular geographic area, that the aggregate level for the particular agricultural unit has been met.

In some implementations, the method includes, for each subscriber, storing the transactional data received from the subscriber separate from the transactional data received from each other subscriber; and separately processing the transactional data received from each subscriber.

In some implementations, separately processing the transactional data received from each subscriber comprises, for each subscriber, processing the transactional data received from the subscriber at processing time that is different from a respective processing time that the transactional data for each other subscriber is processed.

In some implementations, the method includes receiving, from each subscriber of the plurality of subscribers, a unique data mapping schema of the subscriber within their unique enterprise resource planning (ERP) system and Standard Operating Procedures (SOPs) that maps transactional data of the subscriber to a standard transactional data form common to all subscribes.

In some implementations, the method includes receiving, from a subscriber, data indicating a proprietary package type of the subscriber, the proprietary package type being a package type not used by other subscribers; and precluding display of supplier proprietary package types for packages that are not specified to be mapped to non-proprietary package types.

In some implementations, allowing display of the market metric data and the benchmark metric data for the particular agricultural unit comprises allowing display of the market metric data and the benchmark metric data for particular commodity or non-proprietary package type.

In some implementations, the method includes receiving, from a subscriber, data indicating the subscriber has turned off a data feed that provides the transactional data of the subscriber; and precluding display of market metric data and benchmark metric data upon receiving the data indicating that that the subscriber has turned off the data feed.

In some implementations, the method includes receiving, with the data indicating the subscriber has turned off a data feed that provides the transactional data of the subscriber, a timestamp that specifies the time the data feed has been turned off; and precluding display of market metric data and benchmark metric data upon receiving the data indicating that that the subscriber has turned off the data feed comprises precluding display of only market metric data and benchmark metric data determined after the time the data feed has been turned off.

These features and additional features may realize one or more of the following advantages.

In contrast to USDA AMS reports, an Agricultural Data Intelligence service is available 24 hours a day, 7 days a week, 365 days a year. In some implementations, the Agricultural Data Intelligence service is updated every 30 minutes to provide near real-time insights. The Agricultural Data Intelligence service displays many commodity attributes that are not available on the USDA AMS reports, some of which are listed below.

One attribute is aggregated high/low prices for produce sold that day for all package types (e.g., sizes, and/or other package or commodity attributes like fruit size, grade, color, etc.) and method, with corresponding quantities at those prices by district, state, region, and country (USDA only provides information for a few package types).

Another attribute is aggregated weighted average price by package type, method, and by commodity standard (e.g. pounds, flat, etc.) sold by district, state, region, and country (USDA does not report weighted average prices).

Another attribute is aggregated finished good inventory levels by package type and method by district, state, region, and country (USDA does not report this).

Another attribute is aggregated shipment destinations by district, state, region, and country.

Another attribute is aggregated shipments sold without pricing (typically price after sale PAS) with percent of overall sales and corresponding quantities. This metric will be separated from the aggregated weighted pricing average and be reported by district, state, region, and country.

The data used for these displays is gathered periodically, e.g., every 15 minutes, and backend processes are optimized to standardize, master, and facilitate rapid data display updates. Batch processing on a subscriber-by-subscriber basis can be used to minimize system processing loads. This advantageously enables the provisioning of up-to-date data while utilizing processing resources in an efficient, load-balancing manner.

To prevent data leakage, anonymization processes are implemented for all data gathered. Moreover, processes are implemented the preclude leakage of data to a subscriber should the subscriber attempt to "drill down" to a small geographic region and "target" another subscriber of interest. Likewise, processes are implemented the preclude leakage of data from a subscriber should the subscriber's data and the data of its competitors be of such disparate quantity that the subscriber's data can be inferred from a set of results.

In some implementations, free riding is eliminated by enabling the disclosure of data to a subscriber for only the time period(s) that a subscriber is providing its own market data to the system. Check pointing can be used to freeze results for a subscriber when a subscriber terminates data input to the system, or when a subscriber does not provide input to the system after a period of time (e.g., 48 hours or some other time period). This encourages subscribers to timely provide data to the system, which has two benefits. The first is that the market data are more accurate by inclusion of the subscriber's data. The second is that by providing data in a timely manner, the provisioning of a very large dataset all at once is eliminated, which, in turn, facilitates load balancing in the system, and reduces the abrupt swing of market data due to a large data set impacting market data all at once.

There are many other advantages that subscribers (growers and marketers) realize by using the Agricultural Data Intelligence service. To be able to see aggregated real-time industry pricing by pack type and method is invaluable information to meet consumer demand. Moreover, this aggregated, anonymized data per district, state, region, and country allows growers and marketers that operate in different areas of the globe to better compete in those markets, by increasing quality and/or decreasing waste.

The details of one or more embodiments of the subject matter described in this specification are set forth in the accompanying drawings and the description below. Other features, aspects, and advantages of the subject matter will become apparent from the description, the drawings, and the claims. These features and advantages, and additional features and advantages, are described in more detail below.

DETAILED DESCRIPTION

Overview

In this detailed description, the Agricultural Data Intelligence service is described in the context of an agricultural produce market. However, the systems and methods of the Data Intelligence service can be applied to other types of agricultural markets as well, and thus it is to be understood that the Agricultural Data Intelligence service is not limited to an application only in the produce market.

As described above, prior to the Agricultural Data Intelligence service, growers and marketers lack tools to understand the produce market in a timely manner. Although the USDA created AMS specialty crop reports to communicate pricing, shipping volumes, domestic/international market, and other information to the industry, the reports were antiquated and insufficient. Growers and marketers purchase other tools that seek to represent this AMS data to the industry through graphic visualization.

The Agricultural Data Intelligence service addresses the multiple shortcomings of the AMS specialty crop report. The service receives and aggregates grower/shipper enterprise resource planning (ERP) transactional data (transactional data) into a powerful data analytics, market visualization, and subscriber positional dashboard to provide timely, accurate, secure, confidential, and content-rich industry information. Because the source of the intelligence is ERP transactional data, the service is complete and transparent and not subject to the shortcomings of the partial information that is compiled today by the USDA AMS report.

The systems and methods described below address the technical problems of precluding data leakage while providing agricultural data to multiple subscribers. The system and methods also provide for automated mapping of unique agricultural data (e.g., proprietary package types, etc.) for a particular subscriber to non-unique agricultural data for multiple subscribers, which enables the system to utilize the unique agricultural data without exposing the unique agricultural data of the subscriber to other subscribers. Load balancing is also accomplished in some implementations by processing only subscriber-specific data at subscriber specific processing times.

These features and additional features are described in more detail below.

Figure 1:
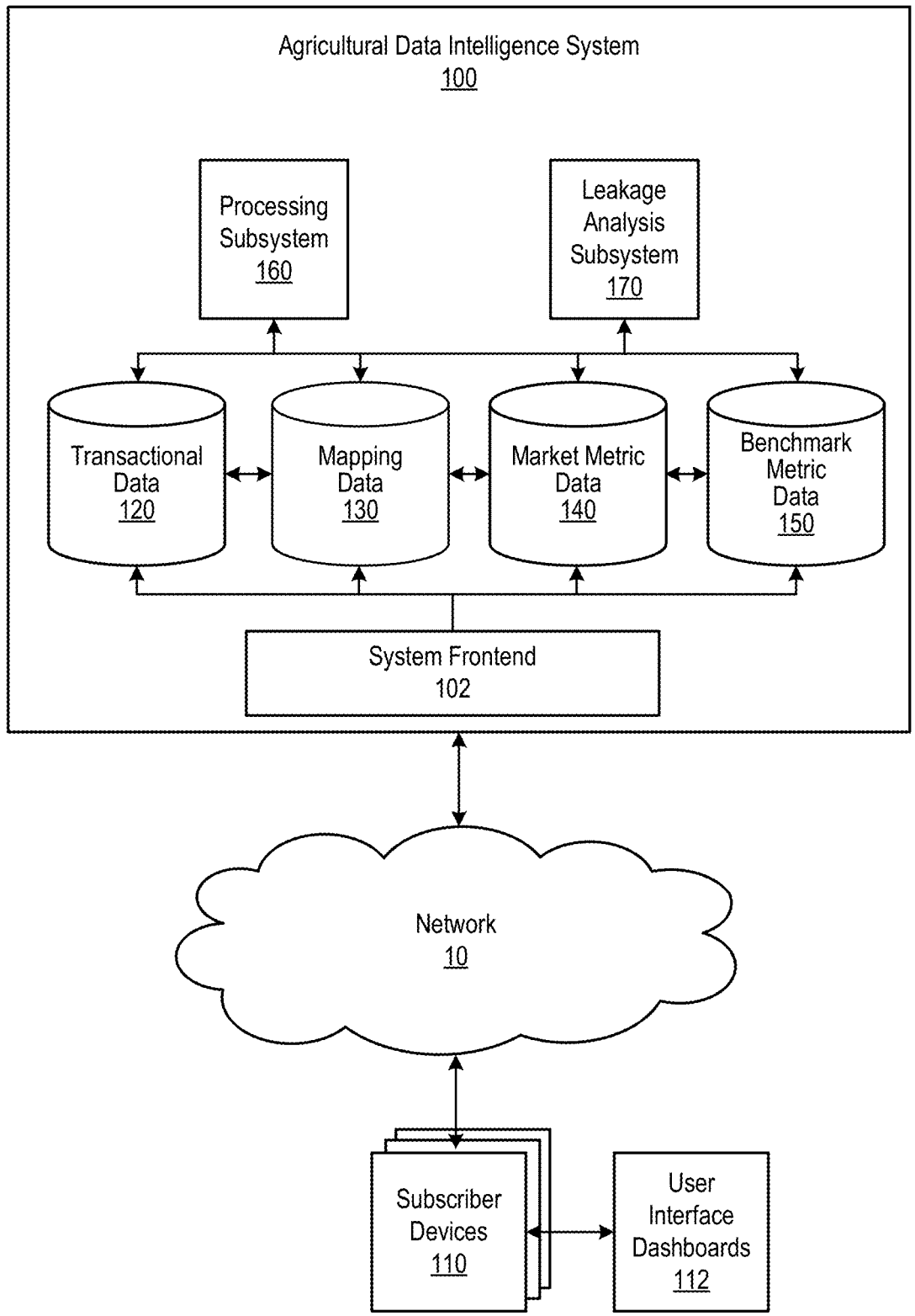
FIG. 1 is a system block diagram of an agricultural data intelligence system.

FIG. 1 is a system block diagram of an agricultural data intelligence system 100. The system 100 is in data communication with a set of subscribers via subscriber devices 110. An example subscriber device 110 is an electronic device that is under the control of a subscriber (e.g., a company or producer that has provides transactional data describing market transactions for agricultural products). The device 110 is capable of requesting and receiving resources and data over the network 10. The devices 110 may include personal computers, mobile communication devices, and other devices that can send and receive data over the network 50. The device 110 typically includes an application, e.g., a web browser or some other application, to facilitate the sending and receiving of data over the network 50 to the system 100. The web browser can enable a user to display and interact with text, images, videos, music and other information typically located on a web page at a website on the world wide web or a local area network. The network can be a local area network (LAN), wide area network (WAN), the Internet, or a combination thereof.

They system 100 includes a frontend 102, such as a web server, that communicates with the subscriber devices 110, receives the data from the devices 110, and generates data (e.g., user interface dashboards 112) for display on the subscriber devices 110.

The subscriber devices 110 each provide transactional data 120. Transactional data 120 describes transactions for agricultural units. Transactions are typically inventory, sale, return, warranty, and rejection transactions, and other transactions, involved in an agricultural market. Moreover, transactions are not just client-customer related (e.g., sales) but also transactions internal to a subscriber's business (e.g., operations). As used in this specification, an "agricultural unit" is a unit or attribute of the product of the transaction. Example agricultural units include package types (e.g., package size, package weight, such as "2 pound blueberry clamshell"); a commodity type, a commodity size (e.g., a size of a particular fruit product), grade, color or any other unit by which a price for a particular commodity, volume of commodity, or quantity of commodity or product can be set. The subscriber devices 110 each provide transactional data 120 and mapping data 130, which will be described in more detail below.

The processing subsystem 160 accesses the transactional data 120 and mapping data 130 and processes the data to generate market metric data 140 and benchmark metric data 150, which will also be described in more detail below. Additionally, a leakage analysis subsystem 170 processes subscriber requests for data to ensure that data provided to subscribers does not leak sensitive information for any particular subscriber. Operation of the leakage analysis subsystem is described in more detail below.

The system 100, in some implementations, periodically updates the market metric data 140 and the benchmark metric data 150, e.g., every N minutes for each set of transactional data 120 received from each subscriber 110, where N can be 15, 30 or some other number of minutes.

For deployment, administrators establish relationships with ERP specialists of the subscribers and work with them to determine the IT links and Statement of Work(s) (SOW(s)) required to facilitate data flow. Each data flow may differ for each subscriber, as each subscriber may provide different sets of transactional data 120. Additionally, subscribers to the system 110, in some implementations, go through an on-boarding plan to organize mutually acceptable Standard Operating Procedures (SOPs) to ensure data integrity and conformity without overhauling the subscriber's current practices.

Subscribers that participate in Agricultural Data Intelligence service provided by the system 100 go through the on-boarding process and provide ERP transactional data. The system 100, by use of the leakage analysis subsystem 170, implements procedures that require a certain number of subscribers per commodity in order to be able to view market data, referred to as a minimum aggregate level. This practice prevents data leakage. Other data leakage techniques are also used, and are described in more detail below.

The ERP transactional data 120 is transmitted via Secure Socket Layer (SSL) encryption to the system 100, where it is securely stored on a SQL database. The database may be cloud implemented or locally managed. In the case of the former, the subscribers' data can be secured by cloud-based security systems. In some implementations, database access is governed by credential authorization as well as two-factor authentication, and access is controlled through credential authorization.

In some implementations, the system 100 processes the transactional data 120 received from the subscribers 110 to provide multiple types of market information. This information may include: aggregated high and low prices for produce sold that day for all package types and method, with corresponding quantities at those prices by district, state, region, and country; aggregate weighted average price by package type, method, and by a commodity standard measure (e.g. pound, flat, etc.) sold by district, state, region, and country; aggregated finished good inventory levels by package type and method by district, state, region, and country; aggregated shipment destinations by district, state, region, and country; and aggregated shipments sold without pricing (typically price after sale PAS) with percent of overall sales and corresponding quantities (in some implementations, this metric will be separated from the aggregated weighted pricing average, and reported by district, state, region, and country).

The system 100 calculates an aggregate weighted average price. This price is a calculation of the total shipment price (quantity×unit price) of every transactional and then divided by the total quantity. Merely averaging the high and low price can yield deceiving data. Thus, in some implementations the aggregate weighted average incorporates volume and shows the correlation between price and units shipped.

Another metric is the commodity standard measure. This is the weight or unit value most respected and recognizable at the initial level of production (e.g., pounds for blueberries). For growers and marketers, this information provides insights into how the market is shaping at the finished goods creation level. For commodities that are packaged in multiple sizes, translating price and quantity data to a commodity standard ties the grower's business management standardized unit of measure. For marketers, this level of detail helps ensure they are providing supply to meet specific package sizes consumers demand and work with growers to pivot package types efficiently.

The system 100 incorporates feedback from subscribers to calculate this commodity standard measure. In particular, administrators of the Agricultural Data Intelligence service work with subscribers to understand what factors (e.g., overpack) need to be considered to standardize the actual produce packed by package type. Though there is sometimes not a one-size-fits-all measure for every grower and marketer, packer and package size, the determined standard is applied to all subscribers within that commodity of Agricultural Data Intelligence service.

The system 100 also calculates aggregated finished good inventory levels. This intelligence is critical during regional market transitions and climate uncertainty.

The system 100 also calculates metrics based on aggregated shipment destinations. Shipment destinations provide insights into what markets are being supplied at what price/pack/method, etc. and what opportunities exist for growers/marketers to pursue to meet consumer demand. Understanding consumer demand and their ever-changing tastes allows decision makers to precisely grow, package, and market their produce to meet what consumers want. This detail is critical intelligence to the supply side that revolutionizes produce supply chain management. Produce is a highly perishable commodity and yet an absolute necessity to sustain human life. With this knowledge, growers and marketers are given the tools to work concurrently with retail and food service to develop new markets, create efficiencies in the supply chain, and feed the ever-rising world population.

The system 100 also calculates aggregated shipments sold without price. Price-after-sale (PAS) shipment is a key metric not included in the USDA AMS specialty crop report. PAS shipments are valuable in assessing the state of the market. This information provides a rate useful to illustrate possible times of market saturation and the severity of it.

They system 100 also provides content-rich industry intelligence in a business intelligence (BI) platform. In some implementations, the BI platform is a set of dashboards in user interfaces 112 that use data visualizations to provide information to subscribers. These dashboards 112 may have multiple viewpoints. These are the aggregated commodity market picture, a trends dashboard to visualize current market conditions, the subscriber's benchmarks to that market, a deep-dive intelligence and analytics viewpoint, and a research dashboard for data exploration and report building. Built-in filtering features give the user the ability to compare and correlate different parameters of the data. These filters are available at the whole dashboard level (e.g., date range or origin) or at an individual graphic level (e.g. average FOB price vs Shipping volume or finished goods inventory levels). Key performance indicators (KPIs) are included to quickly gauge how the market is doing compared to recent trends and historical averages and how the subscriber compares to the current aggregated market view.

Calculations and data storage are optimized to reduce computer overhead for calculations and filtering. This ensures the system 100 service is speedy and responsive.

The background calculations are innovative and designed with performance in mind. Lastly, the dashboards 112 are designed to display relevant data in an intuitive manner.

The system 100 has a number of KPI's available, including: FOB price, inventory, shipped volumes, percent of PAS orders, percent of rejected orders, cost of quality, settlement of PAS orders, etc. These KPIs are based on comparisons to historical averages and current trends. Additionally, these same metrics are available on the subscriber dashboard compared to the current market for benchmarking.

In some implementations, data may be presented to a subscriber based on the subscriber's market. For example, grower subscribers and marketer subscribers may see the data in different contexts based on their respective mapping data. For example, growers may see the market data in the commodity standard measure (e.g., pounds in blueberries), while marketers may see the market data by this and by package type. Thus, the underlying market metric data 140 calculated and determined by the system 100 may be further processed by use of the mapping data 130 so that the market metric data 140 are shown to each subscriber in a manner and in units to which the subscriber is accustomed.

In some implementations, the mapping data 130 is, for each subscriber, a unique data mapping schema of the subscriber within their unique ERP system and SOPS. This mapping data can be used to map subscriber data describing proprietary attributes to standardized attributes for each subscriber. For example, a particular subscriber may use proprietary package type, e.g., "1.5 L Blueberry Package," which is a proprietary package type not used by other subscribers. The system 100 may determine the attribute is proprietary when, for example, the attribute is not used by any other subscriber, or when the subscriber specifies it is proprietary. In the case of the latter, the system 100 may verify that attributes specified by a subscriber as proprietary are not used by any other subscriber before determining the attribute is proprietary.

To prevent data leakage with respect to proprietary attributes, the system 100 can preclude display of supplier proprietary attributes for attributes that are not used by other subscribers. For example, the system 100 can preclude display of supplier proprietary package types, as the uniqueness of the package type would result in a data leak of transactional information for that subscriber. Instead, the attribute can be mapped by the system 100, or by the subscriber by the mapping data 130, to standardized or common attributes. For example, the "1.5 L Blueberry Package" used by a particular subscriber may be converted to pounds so that the cost per pound of the produce is used for the subscriber as the transactional data 120. Thus, the subscriber can provide transactional data to the system 100 that can, in turn, be used to determine overall market metric data 140 for an entire market without disclosing the subscriber's particular pricing and packaging schema.

In the event a subscriber has a proprietary package type that is a package type not used by other subscribers, the system 100 can preclude display of supplier proprietary package types for packages that are not specified to be mapped to non-proprietary package types. Again, this prevents inadvertent data leakage.

Example Process Flows

Various processes and operations of the system 100 are described with reference to FIGS. 2-6 below. Each the process flows are implemented in a data processing apparatus of one or more computers.

Figure 2:
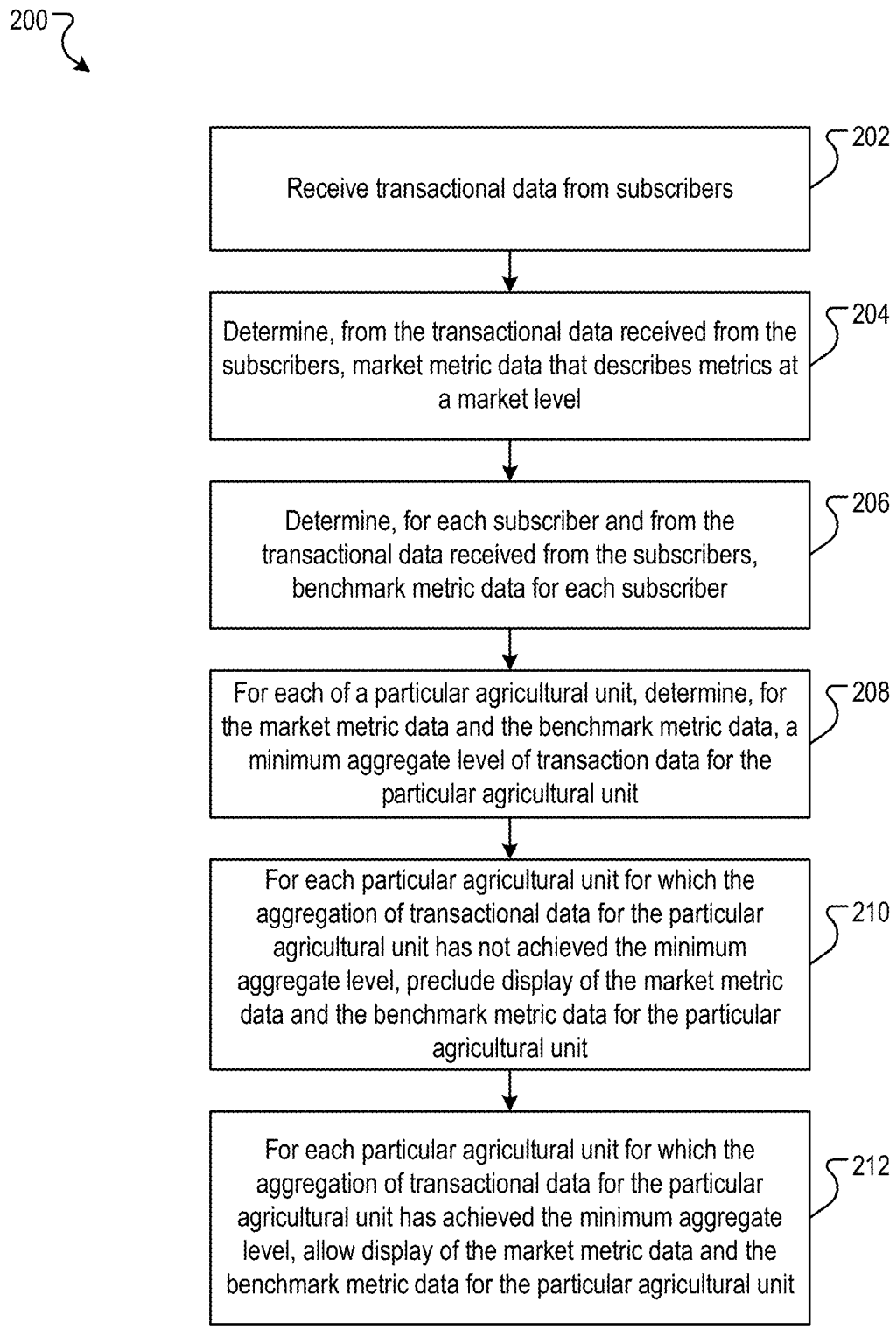
FIG. 2 is a flow diagram of an example process for receiving and processing agricultural data from subscribers.

FIG. 2 is a flow diagram of an example process 200 for receiving and processing agricultural data from subscribers. The process 200 processes transactional data from subscribers, processes the data to generate market metric data 140 and benchmark metric data 150, and allows for display of the data to the subscribers while ensuring that data leakage does not occur.

The process 200 receives transactional data from the subscribers (202). The transactional data describing market transactions for agricultural products. The transactional data are data that are specific to a particular agricultural product transaction. This data may include the kind of product sold (e.g., blueberries, carrots, etc.), the packaging (e.g., one pound containers, three pound flats, etc.), the price, shipping costs, refunds, and other transactional data. Additional examples of transactional data are described and illustrated with reference to FIGS. 7-11 below.

The process 200 determines, from the transactional data received from the subscribers, market metric data that describes metrics and metric values at a market level (204). The metrics at the market level are based on an aggregation of transactional data from the subscribers, and may include averages, trends, etc. Additional examples of metrics at the market level data are described and illustrated with reference to FIGS. 7-11 below.

The process 200 determines, for each subscriber and from the transactional data received from the subscribers, benchmark metric data for each subscriber (206). The benchmark metric data describes, for the subscriber, benchmark values for the subscriber that compare market performance of the subscriber to the metrics at the market level. Examples of benchmark metrics and values are described with reference to FIG. 9 below.

The process 200, for each of a particular agricultural unit, determines, for the market metric data and the benchmark metric data, a minimum aggregate level of transactional data for the particular agricultural unit (208). The minimum aggregate level is an aggregate level that, when met, ensures that data leakage of a particular subscriber does not occur by either displaying subscriber specific transactional data of a particular subscriber to other subscribers, or by presenting a data set that can be manipulated through filtering to reveal or estimate the subscriber specific transactional data of a particular subscriber. Examples of aggregate levels include a minimum number of multiple subscribers from which transactional data for a particular type is received, or receiving enough transactional data from the multiple subscribers so that filtering or other data manipulation techniques does not reveal or indicate particular transactional data for a particular subscriber. Examples of determining minimum aggregate levels are described with reference to FIGS. 3-5.

The process 200, for each particular agricultural unit for which the aggregation of transactional data for the particular agricultural unit has not achieved the minimum aggregate level, precludes display of the market metric data and the benchmark metric data for the particular agricultural unit (210). The process 200, by precluding display, ensures that data leakage does not occur. An exception to this step can occur, however, when a particular subscriber is viewing its own data.

The process 200, for each particular agricultural unit for which the aggregation of transactional data for the particular agricultural unit has achieved the minimum aggregate level, allows display of the market metric data and the benchmark metric data for the particular agricultural unit (212). Provided that data leakage will not occur, the market data and benchmark data is displayed to the subscribers. The market data displayed are also anonymized, e.g., provided at a market level that does not expose a particular subscriber, so that data provided by each subscriber cannot be attributed to a particular subscriber. Example UI dashboards are described with reference to FIGS. 7-11 below.

Figure 3:
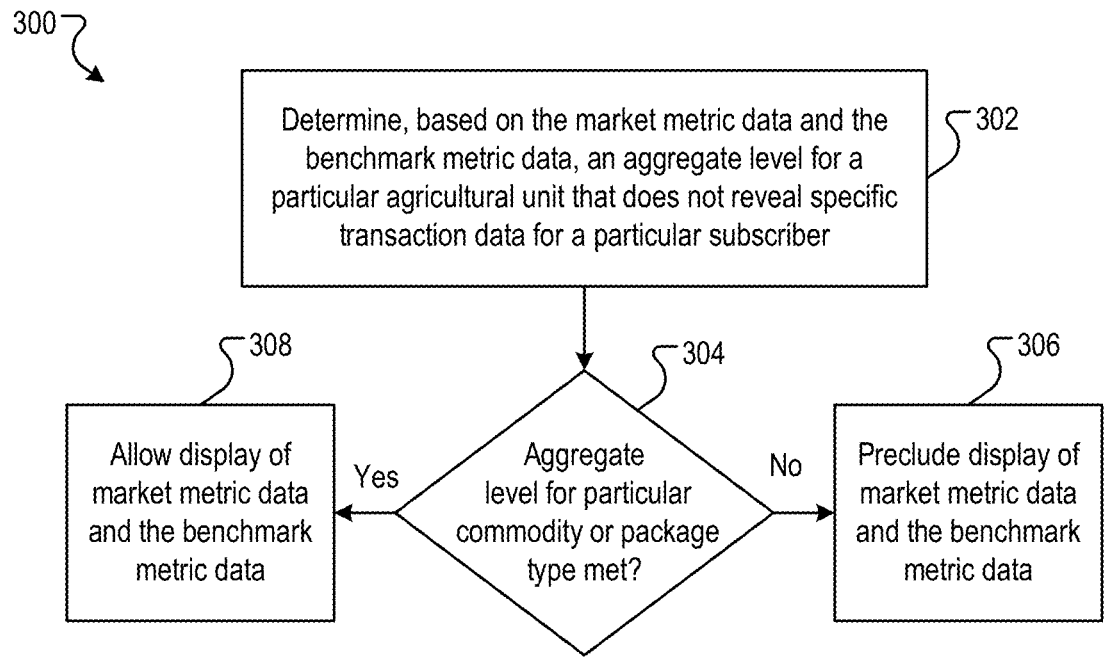
FIG. 3 is a flow diagram of an example process for precluding data leakage of agricultural data.

FIG. 3 is a flow diagram of an example process 300 for precluding data leakage of agricultural data.

The process 300 determines, based on the market metric data and the benchmark metric data, an aggregate level for a particular agricultural unit that does not reveal specific transactional data for a particular subscriber (302). Examples of aggregate levels include a minimum number of multiple subscribers from which transactional data for a particular type is received, or receiving enough transactional data from the multiple subscribers so that filtering or other data manipulation techniques does not reveal or indicate particular transactional data for a particular subscriber. For example, if a minimum number of subscribers is five, then for any particular type of transactional data, such as the price of blueberries per pound, that particular type of transactional data must be received from at least five subscribers before overall market and benchmark data can be shown.

In another implementation, or a variation of this implementation, the transactional data received from each of the minimum number of subscribers must be of such quantity that the transactional data from a particular subscriber cannot be inferred from the market data and benchmark data presented. For example, for any particular type of transactional data, each subscriber must provide at least a minimum number of separate transactions (e.g., 10), or a minimum volume of product (e.g., 500 units, where a unit is a measurable transactional amount for which market data is generated, such as pounds for a price per pound market value).

The process 300 determines whether the aggregate level for particular agricultural unit is met (304). If the process 300 determines the aggregate level for particular agricultural unit is not met, then the process 300 precludes display of market metric data and the benchmark metric data (306). For example, if transactional data is received from only four subscribers, the process 300 precludes display. Likewise, if transactional data is received from more than the minimum number of subscribers, but less than the minimum number of subscribers have provided a minimum number of separate transactions for a particular transaction type, then display of the data for the particular transaction type is precluded.

Conversely, if the process 300 determines the aggregate level for particular agricultural unit is met, then the process 300, then the process 300 allows display of market metric data and the benchmark metric data (308). For example, if transactional data is received from more than the minimum number of subscribers, and a minimum number of subscribers have provided the minimum number of separate transactions for a particular transaction type, then display of the data for the particular transaction type is allowed.

Figure 4:
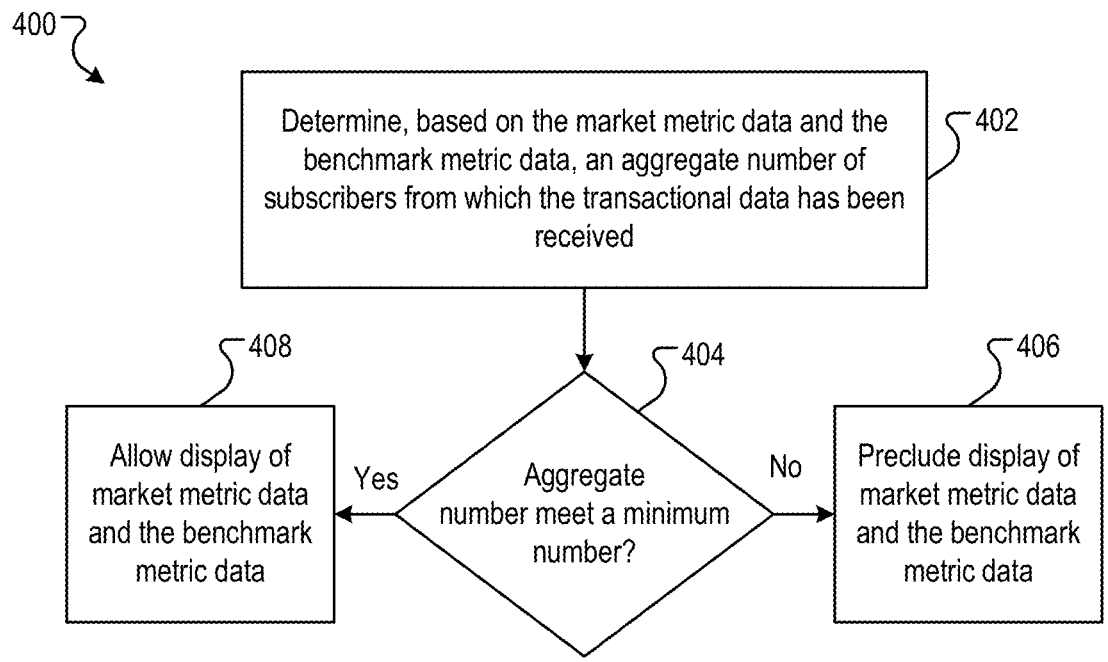
FIG. 4 is a flow diagram of another example process for precluding data leakage of agricultural data based on a number of subscribers.

FIG. 4 is a flow diagram of another example process 400 for precluding data leakage of agricultural data based on a number of subscribers. The process 400 focuses only on an aggregate number of subscribers from which the transactional data has been received.

The process 400 determines, based on the market metric data and the benchmark metric data, an aggregate number of subscribers from which the transactional data has been received (402). For example, the aggregate number of subscribers may be five.

The process 400 determines whether the aggregate number meets a minimum number (404). For example, if the minimum number is five, then then aggregate number has been met; conversely, if the minimum number is seven, then the aggregate number has not been met.

If the process 400 determines the aggregate number does not meet the minimum number, then the process 400 precludes display of market metric data and the benchmark metric data (406). The process 400, by precluding display, ensures that data leakage does not occur. An exception to this step can occur, however, when a particular subscriber is viewing its own data. Conversely, if the process 400 determine the aggregate number does meet the minimum number, then the process 400 allows display of market metric data and the benchmark metric data (408).

Figure 5:
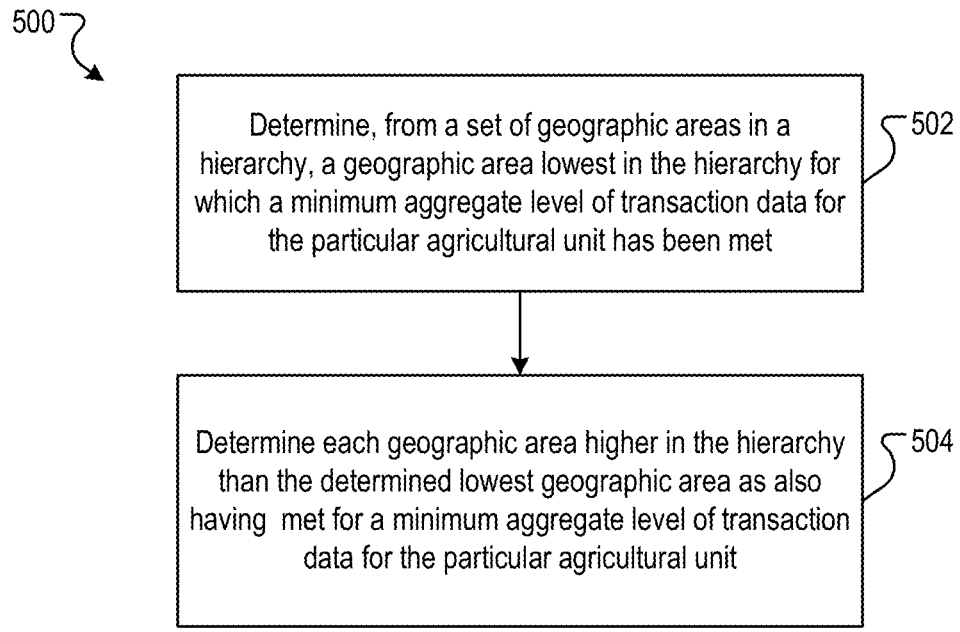
FIG. 5 is a flow diagram of another example process for precluding data leakage of agricultural data based on geographic areas.

FIG. 5 is a flow diagram of an example process 500 for another example process for precluding data leakage of agricultural data based on geographic areas. In some implementations, the system 100 provides market and benchmark data according to geographic areas. The geographic areas are hierarchically arranged so that a geographic area higher in a hierarch is inclusive of all geographic areas lower in the hierarchy. For example, the geographic areas may be city, county, state, region, and country, with country highest in the hierarchy, and city lowest in the hierarchy.

The process 500 determines, from a set of geographic areas in a hierarchy, a geographic area lowest in the hierarchy for which a minimum aggregate level of transactional data for the particular agricultural unit has been met (502). For example, the process may determine a geographic area lowest in the hierarchy for which the transactional data for the particular agricultural unit has been received from at least a plurality of subscribers for the particular geographic area. Alternatively, the process 500 may determine a geographic area lowest in the hierarchy for which an aggregate level for a particular agricultural unit that does not reveal specific transactional data for a particular subscriber has been met. By way of example, assume that the geographic area so determined is a state.

The process 500 determines each geographic area higher in the hierarchy than the determined lowest geographic area as also having met for a minimum aggregate level of transactional data for the particular agricultural unit (504). Continuing with the example, the process 500 will also determine that the geographic areas of region and country will also have met a minimum aggregate level of transaction data for the particular agricultural unit. Conversely, the city and country geographic areas will not be determined to have met the minimum aggregate level. Accordingly, data leakage that could otherwise occur by focusing on a particular subscriber's location is precluded.

Figure 6:
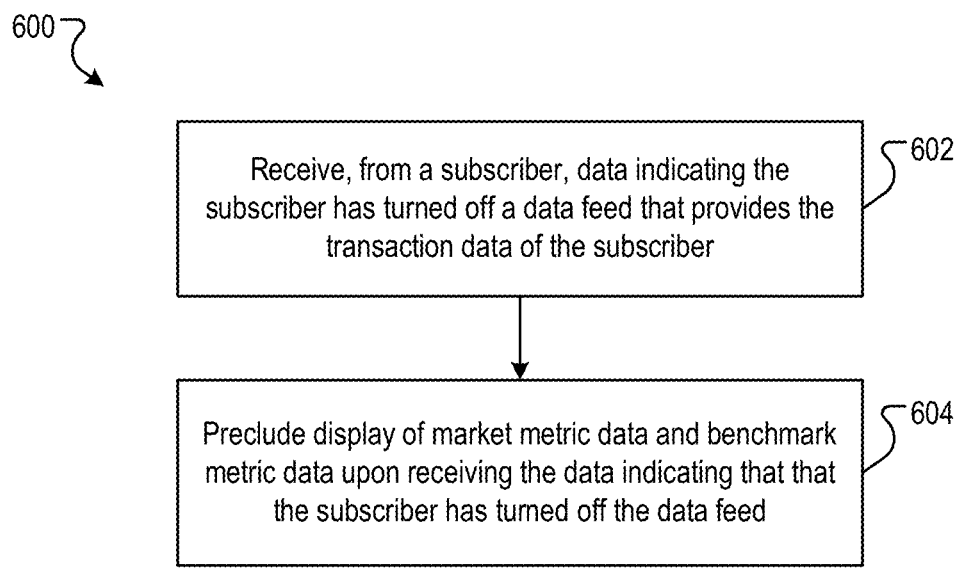
FIG. 6 is a flow diagram of an example process for precluding market metric data based on a subscriber turning off a data feed.

FIG. 6 is a flow diagram of an example process 600 for precluding market metric data based on a subscriber turning off a data feed. The process 600 encourages subscribers to provide data to the system on an ongoing basis. This precludes free riding, and also reduces the occurrence of a subscriber providing large batches of data (e.g., monthly), which could result in a large commitment of processing resources, and may also result in abrupt changes in the market and benchmark data.

The process 600 receives, from a subscriber, data indicating the subscriber has turned off a data feed that provides the transactional data of the subscriber (602). For example, the device 110 of the subscriber may not respond to a request for data from the system 100, or the system may determine, based on timestamps of subscriber records, that the subscriber has ceased providing data for a predefined period of time, e.g., one day, or some other time period.

The process 600 precludes display of market metric data and benchmark metric data upon receiving the data indicating that that the subscriber has turned off the data feed (604). For example, they system 100 can preclude display of market metric data and benchmark metric data upon receiving the data indicating that that the subscriber has turned off the data feed. In a variation of this implementation, based on the timestamps that specifies the time the data feed has been turned off and when the data feed was active, the system may allow only the market metric data and benchmark metric data determined after the time the data feed has been turned off is precluded from being displayed. The market metric data and benchmark metric data determined while the subscriber had an active data feed can still be displayed to the subscriber. In these implementations, the system 100 may prepare market snapshot data (check pointing) for each subscriber after each data feed is received. Upon the subscriber resuming the data feed, the snapshot will be updated from that point. When transactional data accumulated from the time the data feed was turned off to the time that the data feed was resumed is transmitted to the system, market and benchmark data are updated to take into account the accumulated transactional data received. In addition to addressing the technical problem of managing data updates for multiple subscribers, this also limits the ability of subscriber to manipulate market metric data or engage in free riding.

Example Dashboards

Figure 7:
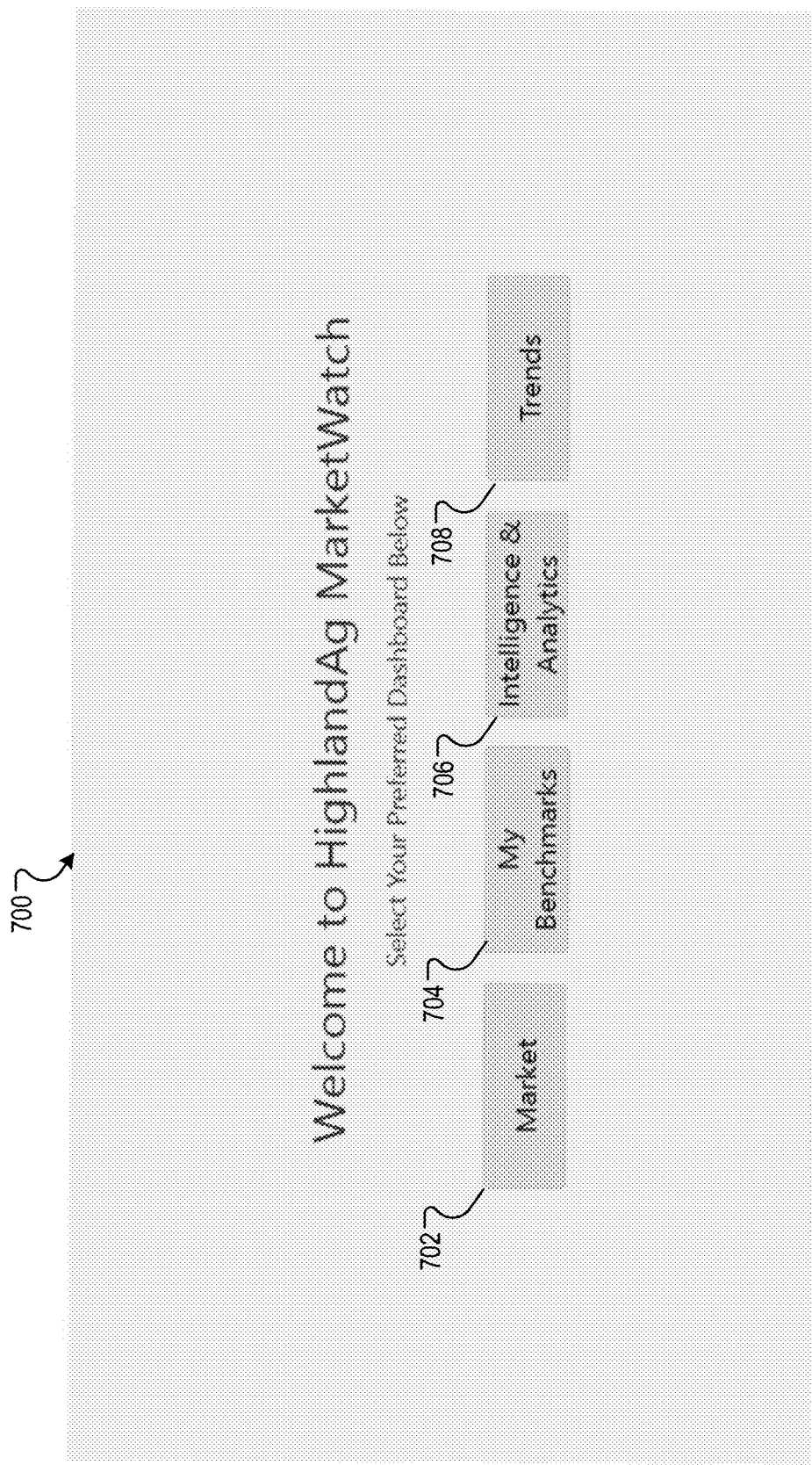
FIG. 7 is an illustration of a user interface for dashboard selection.

FIG. 7 is an illustration of a user interface 700 for dashboard selection. The user interface 700 may be displayed on a subscriber device 100, such as a computer. Four illustrative dashboard options are shown—a market dashboard option 702, the selection of which results in the display of the market dashboard 800 of FIG. 8; a benchmark dashboard option 704, the selection of which results in the display of the benchmark dashboard of FIG. 9; and intelligence and analytics dashboard option 706, the selection of which results in the display of the intelligence and analytics dashboard 1000 of FIG. 10; and a trends dashboard option 708, the selection of which results in the display of the trends dashboard 1100 of FIG. 11.

Figure 8A:
FIG. 8A is an illustration of a market dashboard.

FIG. 8A is an illustration of a market dashboard 800. The market dashboard 800 is but one of several market dashboards that can be shown. Generally, the market dashboards may show a number of different market features, and may have a number of filtering options. The filters can include: Time selections (e.g. day, week, and user-customizable periods); conventional or organic method selections; origin of finished goods (e.g. drilldown to district, state, region, or country levels); Specific package selections (e.g. 12—1 PT); other commodity attributes (e.g. fruit size, color, grade, environment, variety, etc.); shipping destination type (e.g. retail & food service vs. spot market); and combination of these filters using dashboard standard and cross-filtering tools.

Market metric values can include aggregated high/low prices for produce sold during the selected time period for all package types (and/or other commodity attributes) and method, with corresponding quantities at those prices by district, state, region, and country (USDA only provides information for a few package sizes). These prices need not include $0 POs (including settled) or rejected POs, and can be visualized by a table displaying these values as well as other beneficial package-specific information.

Market metric values can also include aggregated weighted average price by package size, method, and by commodity standard (e.g. pounds, flats, etc.) sold by district, state, region, and country (USDA does not report weighted average prices). This value is calculated at a gross level and at a net level where the gross weighted average price does not include $0 POs or rejections. The net level accounts for settlements that post at a later time period after PAS shipments and rejections occur.

In some implementations, certain historical time periods allow the user to compare the gross to the net average price. The net average price includes weighted average sold (with firm price) summed with weighted average sold ($0 POs settled) while subtracting settled rejection costs.

A variety of visualizations can be made available. For example, a table may be used to show weighted average price by package type (and/or other commodity attributes); a line chart can be used to compare against volumes like finished goods, shipping, and rolling inventory; a card visual can be used to show clearly the gross average price by commodity standard (e.g. pound, flats, etc.), or to show a net report card from gross average price within a selected time period to net average price within that same time period, or to show trends in average price.

Market metric values can also include aggregated finished goods creation levels by package type (and/or other commodity attributes), method, and by district, state, region, and country. This is also calculated in a commodity standard value (e.g. pounds, flats, etc.). Visualizations may include a table to show finished goods creation by package type (and/or other commodity attributes). Card visuals can be used to show the finished goods creation by commodity standard (e.g. pounds, flats, etc.), and trends in finished goods creation Market metric values can also include aggregated shipping volume by package type (and/or other commodity attributes), method, and by district, state, region, and country. This is also calculated in a commodity standard value (e.g. pounds, flats, etc.). Visualizations may include a table to show shipped volume by package type (and/or other commodity attributes), and card visuals to show the volume shipped by commodity standard (e.g. pounds, flats, etc.) and trends in shipping volumes.

Market metric values can also include aggregated finished good inventory levels by package type (and/or other commodity attributes), method, and by district, state, region, and country. This is also calculated in a commodity standard value (e.g. pounds, flats, etc.). With shipped volume, inventory is used to calculate percentage of inventory that has shipped for any given time period. Visualizations include a table to show inventory levels by package type (and/or other commodity attributes). Visualizations also include card visuals to show the inventory level by commodity standard (e.g. pounds, flats, etc.), the percentage shipped (rate of sale) and trends inventory level.

Market metric values can also include aggregated shipments sold without pricing (i.e., PAS) as a percentage of overall sales. This metric is separated from the aggregated weighted pricing average. PAS orders as a result of a rejection are not included here and represented in the rejection values. A card visualization can be used to show the percentage of sales shipped as PAS, settled price, PAS price per commodity standard, and net average price per standard commodity.

Yet another market metric can include aggregated rejected shipments as a percentage of overall sales. This metric will be separated from the aggregated weighted pricing average. This metric also includes the costs associated with additional freight, loss in price, and repack costs (if available). This is reported by package type (and/or other commodity attributes), method, and by district, state, region, and country. A card visualization is used to show the percentage of sold commodity rejected, cost of quality, rejected price per commodity, and net average price per standard commodity.

Figure 8B:
FIG. 8B is an illustration of another market dashboard.

FIG. 8B is an illustration of another market dashboard 810. The dashboard 810 of FIG. 8B is similar to the dashboard 800 of FIG. 8A, but is customized for a particular data range.

Figure 9:
FIG. 9 is an illustration of a benchmark dashboard.

FIG. 9 is an illustration of a benchmark dashboard 900. The benchmark metrics are used to show the subscriber's performance compared to the overall market of subscribers. A variety of different benchmarks can be shown, including: a subscriber's gross average price/commodity standard (e.g., lb.) relative to market; a subscriber's net average price/commodity standard relative to market; a subscriber's percentage shipped relative to market; a subscriber's percentage rejection rate relative to market; a subscriber's cost of quality relative to market; and a subscriber's PAS rate relative to market. Visualization can include line and bar charts to compare the subscriber's gross average price metrics to the market over time, and a subscriber's finished goods creation by origin compared to the market.

Figure 10:
FIG. 10 is an illustration of an intelligence and analytics dashboard.

FIG. 10 is an illustration of an intelligence and analytics dashboard 1000. The intelligence and analytics dashboards are used to illustrate various market analytics of a selected market. As shown in FIG. 10, the South East market is selected from a user interface map 1002. Features and filters include time selections (e.g., week and user-customizable periods); conventional or organic method selections; specific package selections (e.g., 12—1 Pint packages); other commodity attributes (e.g., fruit size, color, grade, environment, variety, etc.); shipping destination type (e.g., retail & rood service vs spot market); shipping destination region (e.g., US South Atlantic); and any combination of these filters using dashboard standard and cross-filtering tools. The dashboard 1000 can also include side-by-side comparisons of subscriber and market metrics primarily by shipping destination region. Visualizations may include an interactive map to visually comprehend filtered regions and drilldown into localized states, and various tables that show key metrics by shipping destination region, package type, and/or other commodity attributes (e.g., fruit size, color, grade, etc.).

Figure 11A:
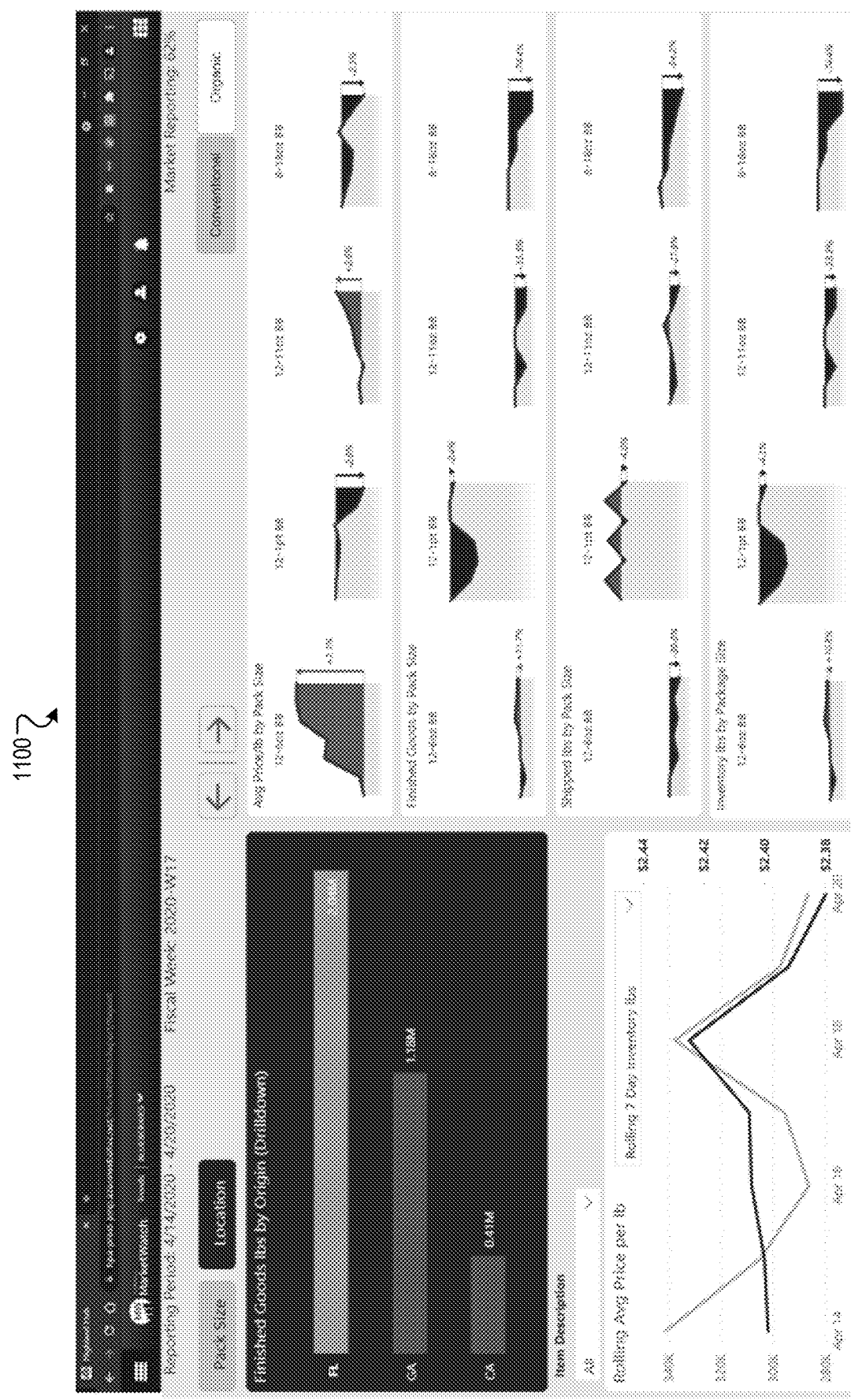
FIG. 11A is an illustration of a trends dashboard.

FIG. 11A is an illustration of a trends dashboard 1100. The trends dashboard 1100 allows subscribers to visualize trends in the market data. Subscribers can quickly analyze developing trends and discover movement insights that answer key business questions. As shown in FIG. 11A, trend data based on pack size is selected. A variety of visualizations and filters can be used. Example filters include pack type and origin location; conventional or organic method selections; origin of finished goods (e.g. drilldown to district, state, region, or country levels; specific package selections (e.g. 12—1 Pint); other commodity attributes (e.g., fruit size, color, grade, environment, variety, etc.); shipping destination type (e.g. retail & food service vs, spot market); and any combination of these filters using dashboard standard and cross-filtering tools aggregated market or subscriber-only selections.

The trend analysis can be set to different periods, e.g., seven days, or some other period, as well as historical comparisons. Visualizations include graphs that compare price, finished goods, shipping, and rolling inventory trends by origin, method, package type, fruit size, etc. In some implementations, the system 100 includes interactive line chart that drills down and compares price trends to finished goods or rolling inventory and shipping trends to finished goods or rolling inventory.

Figure 11B:
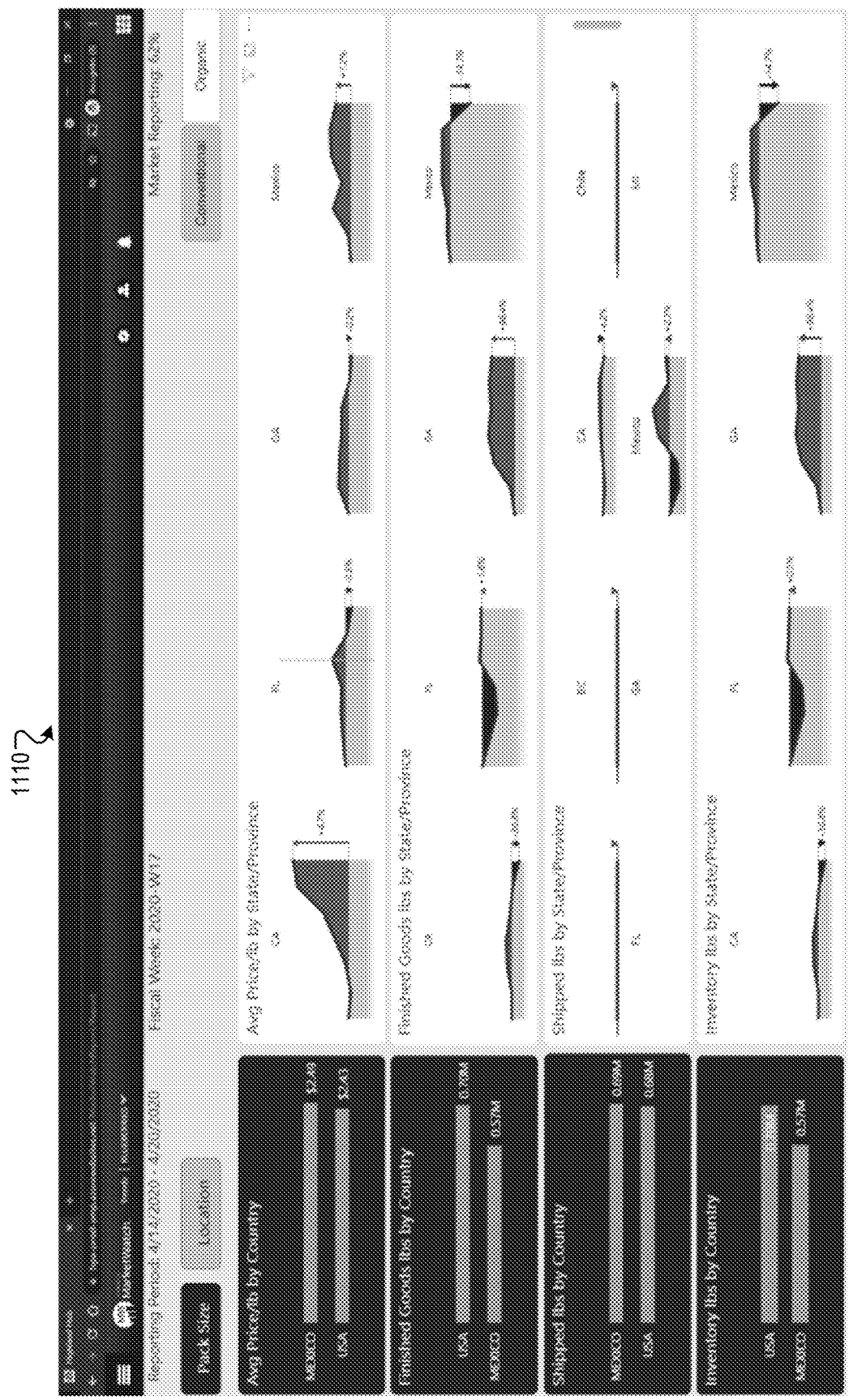
FIG. 11B is an illustration of a trends dashboard.

FIG. 11B is an illustration of a trends dashboard 1110. The dashboard 1110 is similar to the dashboard 1100, but trends data shown on location is selected.

Additional Implementation Details

Because multiple subscribers may utilize the system, there will be multiple data feeds of transactional data from the subscribers. In some implementations, the system uses a workflow that processes data as the data are received from each subscriber. However, in other implementations, the transactional data are stored and buffered for each subscriber and processed periodically for that subscriber. For example, for each subscriber, the system 100 stores the transactional data received from the subscriber separate from the transactional data received from each other subscriber. After a period of time for each subscriber, the system 100 separately processes the transactional data received from subscriber. For example, assume that for N subscribers, there are N sets of stored transactional data to be processed. Each set of transactional data to be processed is the transactional data that has been received from the subscriber since the last time the transactional data for the subscriber was processed. For example, each subscriber may have its own respective buffering time period that begins at a different time for each subscriber. At the end of the period, the transaction data received from the subscriber is processed. This accomplishes load balancing, as the system processes the transactional data received from the subscriber at processing time that is different from a respective processing time that the transactional data for each other subscriber is processed.

In some implementations, the system 100 monitors to emerging or erroneous transactional data. Emerging transactional data is transactional data that is valid and that is of a new type. For example, assume that a new packaging for carrots is used, e.g., a 2.5 pound container, and is specified in the transactional data of a subscriber. The system 100 will search the mapping data 130 for the subscriber and, upon not finding the specified type for the subscriber, will query the subscriber to verify the new packaging or confirm the item is listed in error. In the case of the former, the new packaging will be added to the mapping data for the subscriber. If other subscribers are not using this packaging type, then the packaging will be flagged as a proprietary packaging type. However, if, over time, a minimum number of other subscribers begin using this packaging type (e.g., more than five), then the packaging type will be converted to a non-proprietary packaging type, and market data for this packaging type may then be displayed to all subscribers.

In the case of the latter, the system 100 can, in some implementations, reject the transactional data, and the subscriber can submit corrected transactional data.

While the systems and methods in this written description have been described in the context of districts, states and regions, it is to be understood that the systems and methods can be implemented in any country or region (such as multiple countries or a region within a country), and can be applied according to any jurisdictional, geographical or other areas within these regions. Thus, the examples and figures are illustrative of certain aspects, and not limiting.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus comprising a plurality computers in data communication, the method comprising:
   receiving, from a plurality of subscribers, transactional data from the subscribers, the transactional data describing market transactions for agricultural products;
   for each subscriber:
      associating a buffering time period for the subscriber that begins at a different time from the time the buffering time periods associated with other subscribers begins, thereby to enable the provisioning of processed data while utilizing processing resources in an efficient, load-balancing manner;
      storing the transactional data received from the subscriber separate from the transactional data received from each other subscriber;
      at the end of the buffering time period associated with the subscriber, processing the transactional data received from the subscriber during the buffering time period to load balance the processing of transactional data received from the subscriber so that transactional data received from the subscriber is processed at a processing time that is different from a respective processing time that the transactional data for each other subscriber is processed;
   determining, from the transactional data received from the subscribers and from the processing of the transactional data according to the buffering time periods, market metric data that describes metrics and metric values at a market level, wherein the metrics at the market level are based on an aggregation of transactional data from the subscribers;
   determining, for each subscriber and from the transactional data received from the subscribers and from the processing of the transactional data according to the buffering time periods, benchmark metric data for each subscriber, wherein the benchmark metric data describes, for the subscriber, benchmark values for the subscriber that compare market performance of the subscriber to the metrics at the market level;
   for each of a particular agricultural unit, determining, for the market metric data and the benchmark metric data and from the processing of the transactional data according to the buffering time periods, a minimum aggregate level of transactional data for the particular agricultural unit;
   for each particular agricultural unit for which the aggregation of transactional data for the particular agricultural unit has not achieved the minimum aggregate level, precluding display of the market metric data and the benchmark metric data for the particular agricultural unit; and
   for each particular agricultural unit for which the aggregation of transactional data for the particular agricultural unit has achieved the minimum aggregate level, allowing display of the market metric data and the benchmark metric data for the particular agricultural unit.

2. The method of claim 1, wherein determining, for the market metric data and the benchmark metric data, the minimum aggregate level for the particular agricultural unit comprises:
   determining, based on the market metric data and the benchmark metric data, an aggregate level for a particular agricultural unit that does not reveal specific transactional data for a particular subscriber.

3. The method of claim 2, wherein determining, based on the market metric data and the benchmark metric data, an aggregate level for a particular agricultural unit that does not reveal specific transactional data for a particular subscriber comprises, in part, determining that transactional data for the particular agricultural unit has been received from at least a plurality of subscribers.

4. The method of claim 2, wherein determining, based on the market metric data and the benchmark metric data, an aggregate level for a particular agricultural unit that does not reveal specific transactional data for a particular subscriber comprises, in part:
   determining, from a plurality of geographic areas, wherein the geographic areas are hierarchically arranged so that a geographic area higher in a hierarch is inclusive of all geographic areas lower in the hierarchy, a geographic area lowest in the hierarchy for which the transactional data for the particular agricultural unit has been received from at least a plurality of subscribers for the particular geographic area;
   determining, for the geographic areas higher in the hierarchy than the geographic area lowest in the hierarchy for which the transactional data for the particular agricultural unit has been received from at least the plurality of subscribers for the particular geographic area, that the aggregate level for the particular agricultural unit has been met.

5. The method of claim 2, wherein determining, based on the market metric data and the benchmark metric data, an aggregate level for a particular agricultural unit that does not reveal specific transactional data for a particular subscriber comprises, in part:
  determining, from a plurality of geographic areas, wherein the geographic areas are hierarchically arranged so that a geographic area higher in a hierarch is inclusive of all geographic areas lower in the hierarchy, a geographic area lowest in the hierarchy for which an aggregate level for a particular agricultural unit that does not reveal specific transactional data for a particular subscriber has been met; and
  determining, for the geographic areas higher in the hierarchy than the geographic area lowest in the hierarchy for which the transactional data for the particular agricultural unit has been received from at least the plurality of subscribers for the particular geographic area, that the aggregate level for the particular agricultural unit has been met.

6. The method of claim 1, further comprising:
  receiving, from each subscriber of the plurality of subscribers, a unique data mapping schema of the subscriber within their unique enterprise resource planning (ERP) system and Standard Operating Procedures (SOPs) that maps transactional data of the subscriber to a standard transactional data form common to all subscribes;
    wherein, for at least each of two or more subscribers, the transactional data of the subscriber defines transactional data with attributes unique to that subscriber and different from the other subscribers and different from standardized attributes;
    converting, for each of the two or more subscribers, the transactional data with attributes unique to that subscriber to transactional data with standardized attributes for that subscriber;
  storing, for each of the subscribers, the transactional data received from the subscribers, including the transaction data that was converted to transactional data with standardized attributes; and
  wherein determining the market metric data comprises determining, from the transactional data received from the subscribers, including the transaction data that was converted to transactional data with standardized attributes, market metric data that describes metrics and metric values according to the standardized attributes at a market level, wherein the metrics at the market level are based on an aggregation of transactional data from the subscribers.

7. The method claim 1, further comprising:
  receiving, from a subscriber, data indicating a proprietary package type of the subscriber, the proprietary package type being a package type not used by other subscribers; and
  precluding display of supplier proprietary package types for packages that are not specified to be mapped to non-proprietary package types.

8. The method of claim 1, wherein allowing display of the market metric data and the benchmark metric data for the particular agricultural unit comprises allowing display of the market metric data and the benchmark metric data for particular commodity or non-proprietary package type.

9. The method of claim 1, further comprising:
  receiving, from a subscriber, data indicating the subscriber has turned off a data feed that provides the transactional data of the subscriber; and
  precluding display of market metric data and benchmark metric data upon receiving the data indicating that that the subscriber has turned off the data feed.

10. The method of claim 9, further comprising:
  receiving, with the data indicating the subscriber has turned off a data feed that provides the transactional data of the subscriber, a timestamp that specifies the time the data feed has been turned off; and
  precluding display of market metric data and benchmark metric data upon receiving the data indicating that that the subscriber has turned off the data feed comprises precluding display of only market metric data and benchmark metric data determined after the time the data feed has been turned off.

11. A system, comprising:
a data processing apparatus comprising a plurality computers in data communication; and
a non-transitory computer readable medium in data communication with the data processing apparatus and storing instructions executable by the data processing apparatus and that upon such execution cause the data processing apparatus to perform operations comprising:
receiving, from a plurality of subscribers, transactional data from the subscribers, the transactional data describing market transactions for agricultural products;
for each subscriber:
  associating a buffering time period for the subscriber that begins at a different time from the time the buffering time periods associated with other subscribers begins, thereby to enable the provisioning of processed data while utilizing processing resources in an efficient, load-balancing manner;
  storing the transactional data received from the subscriber separate from the transactional data received from each other subscriber;
  at the end of the buffering time period associated with the subscriber, processing the transactional data received from the subscriber during the buffering time period to load balance the processing of transactional data received from the subscriber so that transactional data received from the subscriber is processed at a processing time that is different from a respective processing time that the transactional data for each other subscriber is processed;
determining, from the transactional data received from the subscribers and from the processing of the transactional data according to the buffering time periods, market metric data that describes metrics and metric values at a market level, wherein the metrics at the market level are based on an aggregation of transactional data from the subscribers;
determining, for each subscriber and from the transactional data received from the subscribers and from the processing of the transactional data according to the buffering time periods, benchmark metric data for each subscriber, wherein the benchmark metric data describes, for the subscriber, benchmark values for the subscriber that compare market performance of the subscriber to the metrics at the market level;
for each of a particular agricultural unit, determining, for the market metric data and the benchmark metric data and from the processing of the transactional data according to the buffering time periods, a minimum aggregate level of transactional data for the particular agricultural unit;

for each particular agricultural unit for which the aggregation of transactional data for the particular agricultural unit has not achieved the minimum aggregate level, precluding display of the market metric data and the benchmark metric data for the particular agricultural unit; and for each particular agricultural unit for which the aggregation of transactional data for the particular agricultural unit has achieved the minimum aggregate level, allowing display of the market metric data and the benchmark metric data for the particular agricultural unit.

12. The system of claim 11, wherein determining, for the market metric data and the benchmark metric data, the minimum aggregate level for the particular agricultural unit comprises:

determining, based on the market metric data and the benchmark metric data, an aggregate level for a particular agricultural unit that does not reveal specific transactional data for a particular subscriber.

13. The system of claim 12, wherein determining, based on the market metric data and the benchmark metric data, an aggregate level for a particular agricultural unit that does not reveal specific transactional data for a particular subscriber comprises, in part, determining that transactional data for the particular agricultural unit has been received from at least a plurality of subscribers.

14. The system of claim 12, wherein determining, based on the market metric data and the benchmark metric data, an aggregate level for a particular agricultural unit that does not reveal specific transactional data for a particular subscriber comprises, in part:

determining, from a plurality of geographic areas, wherein the geographic areas are hierarchically arranged so that a geographic area higher in a hierarch is inclusive of all geographic areas lower in the hierarchy, a geographic area lowest in the hierarchy for which the transactional data for the particular agricultural unit has been received from at least a plurality of subscribers for the particular geographic area;

determining, for the geographic areas higher in the hierarchy than the geographic area lowest in the hierarchy for which the transactional data for the particular agricultural unit has been received from at least the plurality of subscribers for the particular geographic area, that the aggregate level for the particular agricultural unit has been met.

15. The system of claim 12, wherein determining, based on the market metric data and the benchmark metric data, an aggregate level for a particular agricultural unit that does not reveal specific transactional data for a particular subscriber comprises, in part:

determining, from a plurality of geographic areas, wherein the geographic areas are hierarchically arranged so that a geographic area higher in a hierarch is inclusive of all geographic areas lower in the hierarchy, a geographic area lowest in the hierarchy for which an aggregate level for a particular agricultural unit that does not reveal specific transactional data for a particular subscriber has been met; and determining, for the geographic areas higher in the hierarchy than the geographic area lowest in the hierarchy for which the transactional data for the particular agricultural unit has been received from at least the plurality of subscribers for the particular geographic area, that the aggregate level for the particular agricultural unit has been met.

16. A non-transitory computer readable medium storing instructions executable by a data processing apparatus comprising a plurality computers in data communication and that upon such execution cause the data processing apparatus to perform operations comprising:

receiving, from a plurality of subscribers, transactional data from the subscribers, the transactional data describing market transactions for agricultural products;

for each subscriber:
associating a buffering time period for the subscriber that begins at a different time from the time the buffering time periods associated with other subscribers begins, thereby to enable the provisioning of processed data while utilizing processing resources in an efficient, load-balancing manner;

storing the transactional data received from the subscriber separate from the transactional data received from each other subscriber;

at the end of the buffering time period associated with the subscriber, processing the transactional data received from the subscriber during the buffering time period to load balance the processing of transactional data received from the subscriber so that transactional data received from the subscriber is processed at a processing time that is different from a respective processing time that the transactional data for each other subscriber is processed;

determining, from the transactional data received from the subscribers and from the processing of the transactional data according to the buffering time periods, market metric data that describes metrics and metric values at a market level, wherein the metrics at the market level are based on an aggregation of transactional data from the subscribers;

determining, for each subscriber and from the transactional data received from the subscribers and from the processing of the transactional data according to the buffering time periods, benchmark metric data for each subscriber, wherein the benchmark metric data describes, for the subscriber, benchmark values for the subscriber that compare market performance of the subscriber to the metrics at the market level;

for each of a particular agricultural unit, determining, for the market metric data and the benchmark metric data and from the processing of the transactional data according to the buffering time periods, a minimum aggregate level of transactional data for the particular agricultural unit;

for each particular agricultural unit for which the aggregation of transactional data for the particular agricultural unit has not achieved the minimum aggregate level, precluding display of the market metric data and the benchmark metric data for the particular agricultural unit; and for each particular agricultural unit for which the aggregation of transactional data for the particular agricultural unit has achieved the minimum aggregate level, allowing display of the market metric data and the benchmark metric data for the particular agricultural unit.

\* \* \* \* \*